United States Patent [19]
Hastings

[11] Patent Number: 5,294,606
[45] Date of Patent: Mar. 15, 1994

[54] ISOTONIC ENERGY COMPOSITION AND METHOD TO USE SAME

[75] Inventor: Carl Hastings, Glencoe, Mo.

[73] Assignee: Reliv' International Inc., Chesterfield, Mo.

[21] Appl. No.: 981,747

[22] Filed: Nov. 24, 1992

[51] Int. Cl.$^5$ ............... A61K 31/715; A61K 31/34; A61K 31/19; A61K 31/07
[52] U.S. Cl. .................... 514/53; 514/58; 514/474; 514/557; 514/725; 424/600; 424/641; 424/678; 424/679; 424/680; 424/681; 424/682; 426/72; 426/74
[58] Field of Search ............ 424/600, 678, 679, 680, 424/681, 682, 641; 514/23, 53, 58, 474, 725, 557; 426/74, 72

[56] References Cited

U.S. PATENT DOCUMENTS

| | | | |
|---|---|---|---|
| 4,830,862 | 5/1989 | Braun et al. | 426/74 |
| 5,032,411 | 7/1991 | Stray-Gundersen | 426/74 |
| 5,114,723 | 5/1992 | Stray-Gundersen | 426/74 |
| 5,141,758 | 8/1992 | Monte | 426/72 |

*Primary Examiner*—John W. Rollins
*Attorney, Agent, or Firm*—Tilton, Fallon, Lungmus & Chestnut

[57] ABSTRACT

This invention relates to an isotonic energy composition including the carbohydrates, fructose and maltodextrin, the electrolytes, zinc, chromium, calcium, potassium, magnesium, sodium, and the nutrients vitamin C, citric acid and beta carotene. The electrolytes zinc and chromium are delivered in the form of an organic complex. The invention also relates to a method to use the composition.

10 Claims, No Drawings

ISOTONIC ENERGY COMPOSITION AND METHOD TO USE SAME

BACKGROUND OF THE INVENTION

1. Field of the Invention

This invention relates to a multi-electrolyte composition with nutrients and a method to use this composition to provide electrolytes, nutrients and energy lost during physical exertion.

2. Description of Prior Work in the Field

Many fluid replacement and energy drinks are currently being sold. In particular, EXCEED (Ross laboratories) provides the following electrolytes: calcium, magnesium, sodium, potassium and chloride. Similarly, GATORADE (Quaker Oats Co.) contains the following electrolytes: potassium and sodium. Other fluid replacement beverages include: 10K, ERG, ULTRA FUEL, CARBOFORCE and RECHARGE. These drinks offer a variety of electrolyte combinations. None of these drinks, however, provide the electrolytes chromium or zinc. The present invention provides a multi-electrolyte composition including both zinc monomethionine and chromium polynicotinate to provide a better balance of electrolytes. This isotonic energy drink also includes vitamin C and beta carotene as important nutrients for optimum performance.

SUMMARY OF THE INVENTION

The present invention provides an isotonic energy composition that can be administered to provide electrolytes, other nutrients and energy lost during physical exertion, or to those lacking these vital nutrients. More specifically, this invention provides: An isotonic energy composition comprising at least 80% by weight of carbohydrates. The remainder of the composition includes electrolytes consisting of zinc, sodium, chromium, calcium, potassium, and magnesium, and the nutrients vitamin C, citric acid, and beta carotene. In this composition the carbohydrates consist essentially of fructose and maltodextrin, and more specifically about 80% of the carbohydrates are from fructose and about 20% of the carbohydrates are from maltodextrin. An additional feature of this invention is that the electrolytes zinc and chromium are complexed to organic delivery vehicles. In particular in the case of zinc the preferred organic delivery vehicle is monomethionine and for chromium the preferred organic delivery vehicle is polynicotinate.

This invention provides an isotonic energy composition comprising per serving carbohydrates ranging from 15.3 g to 18.1 g the carbohydrates consisting of fructose and maltodextrin; zinc monomethionine ranging from about 2-15 mg, niacin bound chromium ranging from about 25 to 200 μcg, calcium ranging from about 10 to 500 mg, potassium ranging from about 25 to 300 mg, sodium ranging from 10-200 mg, and magnesium ranging from about 10-100 mg. More specifically, the zinc from zinc monomethionine is 4 mg, chromium from niacin bound chromium provides 50 micrograms of chromium, calcium is 100 mg, potassium is 60 mg, sodium is 50 mg and magnesium is 25 mg. Vitamin C is added at 60 mg per serving and beta carotene at 0 to 2 mg. This invention also provides a method to deliver carbohydrates, electrolytes and other nutrients comprising: enterally administering the previously described composition to a human.

DETAILED DESCRIPTION OF THE INVENTION

The present invention provides a multi-electrolyte composition and method to use the same. More specifically, the composition includes the electrolytes: zinc, chromium, calcium, potassium, magnesium, and sodium. These electrolytes replace key nutrients lost during strenuous exercise or absent due to dietary neglect. The composition is delivered enterally as a beverage. The recommended serving size is about 19 grams of composition in 8 ounces of water. The composition administered to athletes has shown positive effects on both strenuous activity situations (improved performance, no cramping or soreness) and routine exercise applications.

In particular, with respect to the electrolytes, the zinc present in the formulation ranges from between about 2–15 mg, but preferably is 4 mg. In the present invention, zinc is delivered in the form of zinc monomethionine. This organic delivery vehicle provides better retention and utilization of the zinc than other simple zinc compounds. Zinc monomethionine, moreover, provides a synergistic formula that is important for providing proper immune system function. The preferred delivery vehicle is OPTIZINC (Interhealth Co.).

Additionally, the multi-electrolyte composition of the present invention includes the electrolyte chromium. Chromium present in the formulation ranges from between about 25 to 200 micrograms, but preferably is 50 micrograms. The chromium is delivered via niacin bound chromium polynicotinate. The preferred delivery vehicle is CHROMEMATE (Interhealth Co.). Niacin bound chromium polynicotinate has been shown to lower blood lipid levels. U.S. Pat. Nos. 4,923,855 and 4,954,492 (hereby incorporated by reference). Additionally, certain biologically active chromium complexes have been identified as a cofactor for insulin, such as GTF. These chromium complexes are responsible for binding insulin to cell membrane receptor sites. At these sites, insulin transports blood sugar (glucose) and vital amino acids inside the cell for energy and protein synthesis. See Rosenbaum, Choosing Chromium Supplement the Interhealth Chromium Series:1 (1990).

Additionally, the composition includes the electrolyte calcium. Calcium ranges from between about 10 to 500 mg, but preferably is 100 mg.

Another electrolyte in the composition is potassium. Potassium ranges from between about 25 to 300 mg, but preferably is 60 mg.

Still another electrolyte included in this composition is magnesium. Magnesium ranges from between about 10–100 mg, but preferably is 25 mg.

Still another electrolyte included in this composition is sodium. Sodium ranges from between about 10–200 mg but preferably is 50 mg.

The composition also includes a carbohydrate source comprising between about 80–95% of the product on a weight basis, but preferably the composition is about 90.0% carbohydrates. In particular, these carbohydrates are composed of fructose and maltodextrin. The carbohydrate source provides a combination of simple and complex carbohydrates. Fructose is a simple carbohydrate and provides sweetness, while not disrupting blood sugar levels. Maltodextrin is a complex carbohydrate. The present percentage of fructose to maltodextrin was selected to provide the best taste. Preferably about 20% of the carbohydrates are maltodextrin and the remainder of the composition is fructose. These sources of carbohydrates are provided to minimize fluctuations in blood sugar that can be caused by simple sugars such as glucose.

Vitamin C and beta carotene are also added as support nutrients to facilitate immune function. Vitamin C is present at about 60 mg per serving and beta carotene is present at about 0 to 2 mg per serving. The composition may also include an oil such as hydrogenated soy oil as a processing aid to improve flow properties. Citric acid is included to this isotonic energy composition. Citric acid ranges from 0.5 g to 1.0 g, but preferably 0.9 g.

The isotonic energy drink can be provided in either powdered or liquid form. In the powdered form it is reconstituted by admixing 19.1 grams of powdered composition with 8 ounces of water. The composition can be either lemon or orange flavored.

EXAMPLE 1

Table 1 shows how to make a lemon-flavored composition within the scope of this invention. To make an isotonic energy drink within the scope of this invention 19.1 grams of this powdered composition are mixed with 8 ounces of water. The composition is best administered before and after vigorous exercise.

TABLE 1

| Ingredient | Weight | |
|---|---|---|
| FRUCTOSE | 433.40 | lbs |
| MALTODEXTRIN | 100.00 | lbs |
| CITRIC ACID | 31.40 | lbs |
| LEMON FLAVOR | 9.40 | lbs |
| TRICALCIUM PHOSPHATE | 8.28 | lbs |
| POTASSIUM CITRATE | 5.50 | lbs |
| HYDROGENATED SOY OIL | 3.50 | lbs |
| VITAMIN C | 1.90 | lbs |
| SALT | 4.10 | lbs |
| MAGNESIUM OXIDE | 1.30 | lbs |
| ZINC MONOMETHIONINE | 285.8 | gm |
| CHROMEMATE (Interhealth Co.) | 7.08 | gm |
| BETA CAROTENE 1% | 285.8 | gm |
| TOTAL: | 600 | lbs |

EXAMPLE 2

Table 2 shows how to make an orange-flavored composition within the scope of this invention.

TABLE 2

| Ingredient | Pounds | |
|---|---|---|
| FRUCTOSE | 437.8 | lbs |
| MALTODEXTRIN | 100.00 | lbs |
| CITRIC ACID | 28.00 | lbs |
| ORANGE FLAVOR | 3.10 | lbs |
| TRICALCIUM PHOSPHATE | 8.20 | lbs |
| POTASSIUM CITRATE | 5.50 | lbs |
| HYDROGENATED SOY OIL | 3.50 | lbs |
| VITAMIN C | 1.90 | lbs |

TABLE 2-continued

| Ingredient | Pounds | |
|---|---|---|
| SALT | 4.10 | lbs |
| MAGNESIUM OXIDE | 1.30 | lbs |
| BETA CAROTENE | 6.00 | lbs |
| ZINC MONOMETHIONINE | 285.8 | gm |
| CHROMEMATE (Interhealth Co.) | 7.08 | gm |
| TOTAL: | 600 | lbs |

Although the invention has been described primarily in connection with special and preferred embodiments, it will be understood that it is capable of modification without departing from the scope of the invention. The following claims are intended to cover all variations, uses, or adaptations of the invention, following, in general, the principles thereof and including such departures from the present disclosure as come within known or customary practice in the field to which the invention pertains, or as are obvious to persons skilled in the field.

I claim:

1. An isotonic energy composition comprising per serving:
   a) carbohydrates ranging from about 15.3 g to 18.1 g, said carbohydrates consisting of about 80% by weight fructose and about 20% by weight maltodextrin; and
   b) zinc monomethionine ranging from about 2-15 mg, as zinc, niacin bound chromium ranging from about 25 to 200 μgm as chromium, calcium ranging from about 10 to 500 mg, potassium ranging from about 25 to 300 mg, magnesium ranging from about 10 to 100 mg and sodium ranging from about 10-200 mg.
   c) Vitamin C ranging from 10 to 200 mg, Beta carotene ranging from 0.1 to 1000 mg and citric acid ranging from 0.5 g to 1.0 g.

2. The composition of claim 1 wherein said zinc monomethionine is 4 mg of zinc.

3. The composition of claim 1 wherein said niacin bound chromium is 50 μgm of chromium.

4. The composition of claim 1 wherein said calcium is 100 mg.

5. The composition of claim 1 wherein said potassium is 60 mg.

6. The composition of claim 1 wherein said magnesium is 25 mg.

7. The composition of claim 1 wherein said sodium is 50 mg.

8. The composition of claim 1 wherein said vitamin C is 60 mg.

9. The composition of claim 1 wherein said citric acid is 0.9 g.

10. The composition of claim 1 wherein said composition includes additional ingredients from the group consisting of: hydrogenated soy oil, orange flavor, lemon flavor and salt.

* * * * *